(12) United States Patent
Rathbone et al.

(10) Patent No.: US 8,807,664 B2
(45) Date of Patent: Aug. 19, 2014

(54) RIM PROTECTOR

(76) Inventors: Christopher Leonard Rathbone, Staffordshire (GB); Curt John Rathbone, Measham (GB)

(*) Notice: Subject to any disclaimer, the term of this patent is extended or adjusted under 35 U.S.C. 154(b) by 171 days.

(21) Appl. No.: 12/601,516

(22) PCT Filed: Nov. 23, 2008

(86) PCT No.: PCT/GB2008/001767
§ 371 (c)(1),
(2), (4) Date: Nov. 25, 2009

(87) PCT Pub. No.: WO2008/142422
PCT Pub. Date: Nov. 27, 2008

(65) Prior Publication Data
US 2010/0171362 A1    Jul. 8, 2010

(30) Foreign Application Priority Data
May 23, 2007 (GB) .................................. 0709845.2

(51) Int. Cl.
*B60B 7/01* (2006.01)

(52) U.S. Cl.
CPC ........................................ *B60B 7/01* (2013.01)
USPC ................... 301/37.22; 152/379.4; 152/381.4

(58) Field of Classification Search
USPC .............. 152/379.4, 381.4; 301/37.22–37.24
See application file for complete search history.

(56) References Cited

U.S. PATENT DOCUMENTS

| | | | | |
|---|---|---|---|---|
| 2,709,472 A * | 5/1955 | Hofweber | ........ | 301/37.22 |
| 2,913,034 A * | 11/1959 | Wall | ........ | 152/513 |
| 2,915,335 A * | 12/1959 | Barnes | ........ | 301/37.22 |
| 2,973,992 A * | 3/1961 | Shoemaker | ........ | 301/37.22 |
| 3,089,731 A * | 5/1963 | Barnes | ........ | 301/37.22 |
| 5,071,684 A * | 12/1991 | Gewecke | ........ | 301/37.24 |
| 5,232,032 A * | 8/1993 | Diernaz | ........ | 152/379.4 |
| 5,967,212 A | 10/1999 | Hameed | | |
| 2006/0175891 A1* | 8/2006 | Diaz | ........ | 301/37.22 |

FOREIGN PATENT DOCUMENTS

| | | |
|---|---|---|
| GB | 2393940 | 4/2004 |
| GB | 2405844 | 3/2005 |
| WO | WO03106194 | 12/2003 |

* cited by examiner

*Primary Examiner* — Jason Bellinger
(74) *Attorney, Agent, or Firm* — Fleit Gibbons Gutman Bongini & Bianco PL; Paul D. Bianco; Gary S. Winer (57) ABSTRACT

A rim protector for a wheel of a vehicle, the rim protector (10) being of the form of a generally circular annulus having an axis (1) defining radial and axial directions, the rim protector comprising a tail portion (32), sized to fit in use between the wheel (3) and a tire (2) fitted to the wheel, and a head portion (31), the head portion (31) being wider than the tail portion, the tail portion extending away from the head portion, in which, when the rim protector (10) is fitted to a wheel (3) such that the tail portion is held between the wheel (3) and the tire (2) and the head portion (32) abuts a rim of the wheel (4), the head portion (31) overlaps the rim (4) and extends further radially over the rim (4) than it does over the tire (2).

20 Claims, 5 Drawing Sheets

RIM PROTECTOR

FIELD OF THE INVENTION

This invention relates to a rim protector for vehicle wheels, particularly but not necessarily exclusively for alloy wheels for cars.

BACKGROUND OF THE INVENTION

It is known to provide vehicles such as cars with alloy wheels. These wheels are generally made of an aluminium or magnesium alloy although the term is sometimes extended to include any non-steel wheel. Alloy wheels are generally lighter than the corresponding steel wheels, and are also considered to be more attractive.

However, alloy wheels are particularly prone to damage due to impacts with, for example, kerbs at the side of roads. This is because they are softer than steel wheels. Particularly damaging can be incidents where the vehicle wheel strikes a kerb whilst the vehicle is travelling at speed. This can easily scuff or chip the alloy wheels. The rim of the wheel is most as risk, given that it is the part of the wheel that protrudes furthest horizontally from the car.

We are aware of the UK Patent Application publication GB2 393 940, which discloses a rim protector for an alloy wheel, which comprises an annular element with a portion trapped, in use, between the tyre and the wheel and a head portion that overlaps the rim of the wheel. The head extends further outwards from the axis of rotation of the wheel than inwards.

SUMMARY OF THE INVENTION

According to a first aspect of the invention, there is provided a rim protector for a wheel of a vehicle, the rim protector being of the form of a generally circular annulus having an axis defining radial and axial directions, the rim protector comprising a tail portion, sized to fit in use between the wheel and a tyre fitted to the wheel, and a head portion, the head portion being wider than the tail portion, the tail portion extending away from the head portion, in which, when the rim protector is fitted to a wheel such that the tail portion is held between the wheel and the tyre and the head portion abuts a rim of the wheel, the head portion overlaps the rim and extends further radially over the rim than it does over the tyre.

This has been found to have several possible advantages over prior art devices, such as that disclosed in GB2 393 940. The inventors have appreciated that with prior art devices where the head portion extends further over the tyre than the rim, the tyre side of the protector will most likely come into contact with a kerb first as it is the outermost portion of the protector. The head portion will therefore act as a lever, pivoting about either the junction of the head portion with the tail or where the head portion engages the rim.

The further the head portion extends in the radial direction, the greater the moment applied by the head portion at its junction with the tail portion. Given that this point, where the width of the device changes, will inherently be a weak point, this magnification of forces can lead to the head of the protector tearing away from the tail portion, damaging the protector so that it requires replacement. By reducing the amount by which the head portion extends over the tyre, this magnification effect is reduced.

Furthermore, the inventors have realised that the relatively rigid rim of the wheel is more susceptible to impact damage than the relatively resilient tyre wall. The rim therefore requires greater protection than the tyre, which can be achieved by having the protector extending further over the rim than the tyre.

The head portion preferably has a tyre-engaging surface which, in use, engages the tyre and a rim-engaging surface which engages the rim of the wheel. The tyre-engaging surface may be shaped so that pressure from the tyre on that surface forces, in use, the rim-engaging surface against the rim. This ensures that the rim of the wheel is protected. Typically, the tyre-engaging surface will be curved, and may form part of the junction between the tail and the head portions.

The head portion may be provided with an impact surface, on the side that is radially outward in use. This impact surface may be sloped so that, when the rim protector is fitted between a tyre and a wheel, when moving radially inwards the impact surface slopes axially outwards away from the tyre. Preferably, this has the effect, in use, to deflect any impacts axially outwards away from the wheel. The head portion may also be provided with a rubbing surface, which lies in use generally in an axial plane over the rim. This surface may act as a "sacrificial" surface, which takes any abrasion which would otherwise scratch the rim.

The impact and rubbing surfaces may be shaped so that, in use, the radially outmost impact surface deflects any impacts axially outwards onto the rubbing surface. Typically, when fitted between the wheel and tyre, the impact surface will be on the part of the head portion over the tyre, whilst the rubbing surface will be over the rim. When fitted to a wheel, the head portion may be thicker axially over the rim at the rubbing portion than at the impact portion over the tyre.

The rim protector is preferably formed from a resilient material. This has been found to have good impact protection.

The tail portion may be provided with at least one ridge on the side that, in use, engages the tyre; the ridge may provide extra frictional engagement with the tyre.

Preferably, when the rim protector is fitted to a wheel, the axis is coaxial with the axis of rotation of the wheel.

The tail portion may be provided with a ridge on the side that, in use, engages the wheel at the end thereof that connects to the head portion. This ridge may be sized and positioned so as to define, in use, the edge of the contact between the tail portion and the wheel, and such that, when installed on the wheel there is a gap between the head portion and the rim of the wheel.

Such a gap means that dirt that works between the head portion and the rim will not generally be forced to abrade the rim of the wheel.

The rim protector may be provided with reference indicia indicating where a user should cut away an arc of the rim protector in order to fit the rim protector to wheels of different sizes. As such, whilst the circumference of the annulus rim protector may be continuous, in the alternative it is not. By breaking the rim protector, it can be installed on a tyre without removing it wholly from the wheel, making installation much simpler.

According to a second aspect of the invention, there is provided a vehicle wheel, fitted with a tyre and a rim protector according to the first aspect of the invention, wherein the tail portion of the rim protector is held between the tyre and the wheel and the head portion extends further radially over the rim of the wheel than it does over the tyre.

Preferably, the rim of the wheel has a maximum outer diameter which contacts the rim protector at a given point; where the rim protector is formed from a resilient material, the internal diameter of the rim protector at the given point when it is not fitted to the wheel is preferably smaller that the maximum outer diameter of the rim. This allows the rim protector to be held onto the wheel by elastic forces; the rim protector can be a stretch fit on the wheel. The difference in diameter may only be small; preferably, the internal diameter of the rim protector at the given point is between 6 and 10 mm, 7 and 9 mm or substantially 8 mm less than the maximum outer diameter of the rim.

The wheel is preferably a wheel of a car, but may alternatively be the wheel of a motorbike, pedal bicycle, goods vehicle, bus, taxi or other rubber-wheeled vehicle. The rim protector may be substantially cylindrically symmetrical about the axis.

According to a third aspect of the invention, there is provided a method of installing the rim protector of the first aspect of the invention onto a vehicle wheel having a tyre installed thereon, comprising providing the rim protector having a non-continuous circumference, forcing one end of the rim protector between the tyre and the wheel, and then working the length of the rim protector between the tyre and the wheel.

Doing this does not require the entire tyre to be lifted off the wheel, and so can be carried out by an end user using little more than, say, a rubber mallet. It is also quicker than having to remove the tyre from the wheel.

The step of providing the rim protector may comprise cutting an arc out of the rim protector in order to provide a rim protector to fit a desired size of wheel. This is very useful, as it allows a single size of rim protector to be used on multiple different sizes of wheels. It is advantageously combined with the provision of indicia indicating where the arc should be cut out of the rim protector for the different sized wheels.

The method may also comprise the step of filling any gap between the ends of the rim protector with a sealing compound. This ensures dirt does not become trapped, and can provide a consistent cosmetic finish if the sealing compound is the same colour as at least a portion of the rim protector.

In the preferred embodiment, the method comprises the step of deflating the tyre, preferably fully, before forcing the first end of the rim protector onto the wheel. Similarly, the method may comprise the step of reinflating the tyre once the rim protector has been fully installed thereon.

BRIEF DESCRIPTION OF THE DRAWINGS

There now follows by way of example only description of embodiments of the invention, described with reference to the accompanying drawings, in which.

DETAILED DESCRIPTION OF THE PREFERRED EMBODIMENTS

The accompanying drawings depict two embodiments of rim protectors according to the various aspects of the invention. It is to be noted that the items depicted—the wheel, tyre and rim protectors—all have cylindrical symmetry about the axis of rotation of the wheel 1, and so the view in cross section of one side is sufficient to determine the shape of the entire device, as the cross section is taken through the plane containing the axis 1. The axis 1 defines a radial direction, perpendicular to the axis, and an axial direction parallel to the axis.

Figures 1, 2:
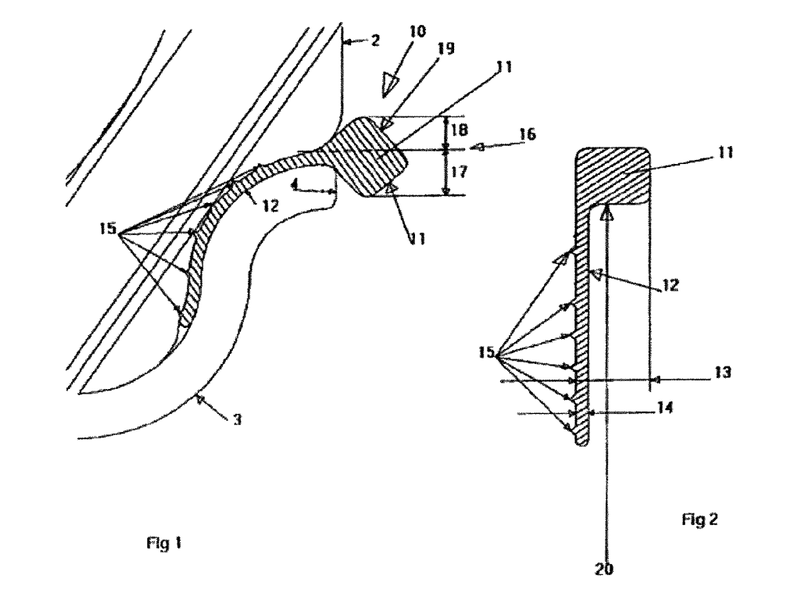
FIG. 1 shows a cross-sectional view of a rim protector according to a first embodiment of the invention, fitted to the wheel of a car.
FIG. 2 shows a cross-sectional view of the rim protector of FIG. 1 before it is fitted to a wheel.

The rim protector 10 according to a first embodiment of the invention is shown in FIGS. 1 and 2 of the accompanying drawings. The rim protector 10 comprises a head portion 11 and a tail portion 12 and is formed of a resilient, semi-rigid plastics material. The head portion 11 is of generally square outline in cross-section, with rounded edges. The tail portion 12 depends from the head portion 11 at a corner thereof; when the rim protector is not installed on a wheel as depicted in FIG. 2 of the accompanying drawings it extends away from the head portion 11 forming a continuous extension to one of the sides. The width 13 of the head portion 11 is much greater than the width 14 of the tail portion 12.

In use, the rim protector 10 is installed between the tyre 2 and wheel 3 of a vehicle such as a car as shown in FIG. 1 of the accompanying drawings. The tail portion 12 is stretched over the outside of the wheel 3, leaving the head overlapping the rim 4 of the wheel 3. The internal diameter 20 in the uninstalled state of the head portion at the point where it engages the rim 4 at the largest part of the wheel 3 is approximately 8 mm smaller than the external diameter of the wheel 3 at that point; the resilient material from which the protector is formed therefore allows for a stretch fit.

The tyre 2 is fitted over the top of the tail portion 12, so that when the tyre 2 is inflated, the air pressure in the tyre pushes the wall of the tyre 2 against the tail portion 12, trapping it against the wheel 3. Ridges 15 on the side of the tail portion 12 facing the tyre 2 increase the frictional engagement of the tail portion 12 with the tyre 2.

FIG. 1 also shows a centre line 16 extending axially outwards from a point equidistant from the rim 4 and the closest part of the tyre 2 to the rim. It can be seen from FIG. 1 that the head portion 11 extends further radially inwards, over the rim 4, than it extends outwards over the tyre 2. In other words, distance 17 is greater than distance 18. As discussed above, this provides greater protection for the rim than otherwise and reduces the risk that an impact on the head portion from the outer side—the tyre side—of the protector 10 rips the protector at the junction between the head portion 11 and the tail portion 12.

Accordingly, in the case of the wheel scraping an object—such as if it were driven into a kerb—it is most likely that the initial impact will be on the outer side 19 of the head portion; the impacting object (e.g. the kerb) will move in a generally radially inwards direction. As this impact surface slopes axially outwards, it acts to deflect gentler impacts outwards. In any case, the rim protector will cover the rim 4 of the wheel 3, so as to protect it against abrasion from and impact by the incident object.

That distance 17 is greater than distance 18 provides greater protection for the rim than otherwise and reduces the risk that an impact on the head portion from the outer side— the tyre side—of the protector 10 rips the protector at the junction between the head portion 11 and the tail portion 12.

Figures 3, 4:
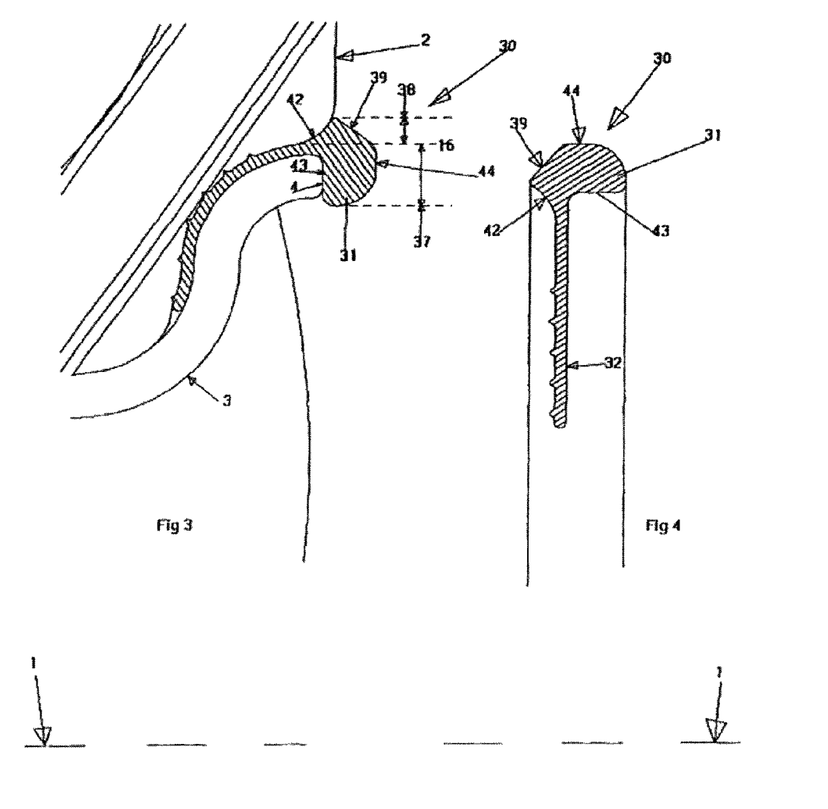
FIG. 3 shows a cross-sectional view of a rim protector according to a second embodiment of the invention, fitted to the wheel of a car.
FIG. 4 shows a cross-sectional view of the rim protector of FIG. 3 before it is fitted to a wheel.
Figure 5:
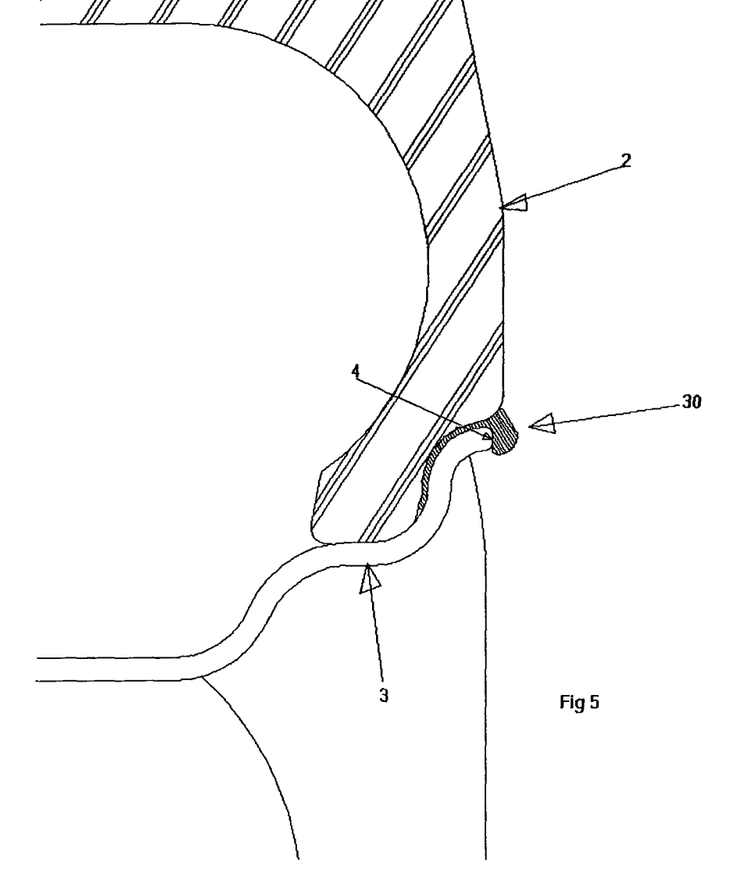
FIG. 5 shows a cross-section view of the rim protector of FIG. 3, showing a larger area of the tyre and wheel.

A second embodiment of the invention is depicted in FIGS. 3 to 5 of the accompanying drawings. This embodiment functions in a similar way to that of the first embodiment and corresponding features have been given corresponding reference indicia, raised by 20. Where a feature is not discussed below, it functions as for the first embodiment.

The main difference between this second embodiment and the first embodiment is the shape of the head portion. Whereas the head portion 11 of the first embodiment was generally square in cross section, the head portion 31 of the second embodiment is more lopsided, with the larger side being on the side that covers the rim 4. Thus, distance 37 is greater than distance 38 by more than the difference between distances 17 and 18. The advantages of having more of the head portion covering the rim are increased, whereas the disadvantages of having more of the head portion on the side covering the tyre are reduced.

The tyre-engaging portion 42 of the head portion 31 is curved, so that as the tyre is placed or inflated over the rim protector 30, the tyre pushed the head portion 31, and specifically the rim-engaging portion 43 against the rim 4. This helps ensure that the head portion 31 covers and so protects the rim 4 in the case of an impact.

As with the first embodiment, the impact surface 39 is sloped so as to deflect any impacts. In this case, the impacts are deflected onto a rubbing surface 44, which lies parallel to the edge of the rim 4 and the general direction of movement of the wheel (that is, radially). Any impacting objects will then rub against the rubbing surface 44, instead of the rim 4. The rubbing surface is effectively sacrificial, taking abrasion instead of the rim 4. As it is made from a relatively soft material, it can be cleaned of scratches by scraping the surface to reveal unscratched material below. In extreme cases, the protector may need to be replaced; however this is still likely to be cheaper than replacing an entire alloy wheel.

Figure 6:
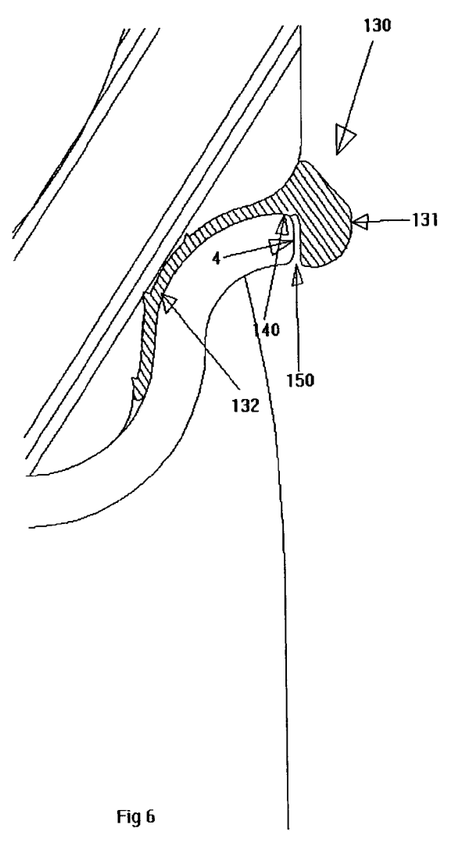
FIG. 6 shows a cross-sectional view of the rim protector of a third embodiment of the invention, fitted to a wheel.
Figure 7:
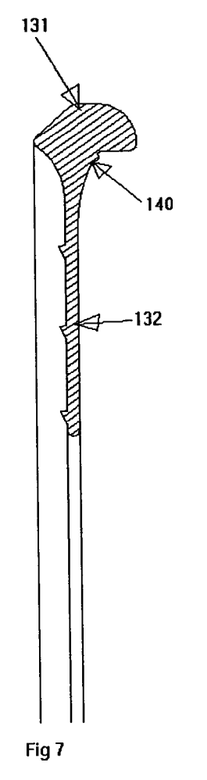
FIG. 7 shows a cross-sectional of the rim protector of FIG. 6, before it is fitted to a wheel.
Figure 8:
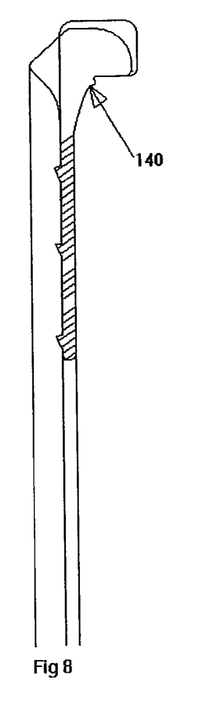
FIG. 8 shows the rim protector of FIG. 6 depicted with different head portion shapes.

A third embodiment of the invention representing a modification of the above two embodiments is shown in FIGS. 6 to 8 of the accompanying drawings. In this embodiment the reference numerals used with respect to FIG. 3 have been increased by 100.

This embodiment works in the same way as that of FIG. 3, except that, at the point at which the tail portion 132 joins the head portion 131, a ridge is provided on the side adjacent the large portion of the head 131. This ridge 140 sits against the rim 4 of the wheel once the rim protector 130 is installed in place. It means that, one the rim protector 130 is installed, a gap 150 will be left between the head portion 131 and the rim 4. This prevents the head portion 131 rubbing against the rim 4.

Particularly if dirt becomes trapped between the head portion and the rim, if it is not for the gap then there is the possibility that the head portion will grind dirt against the rim, possibly abrading it and causing at least cosmetic damage. However, the head portion 131 can still come into contact with the rim 4 should it be required to protect the rim from impact; it is simply the case that unless forced, the head portion 131 will tend to leave the gap 150 between it and the rim 4.

FIG. 8 depicts how this embodiment with the ridge 140 can be used with the head portion shapes of either of the first two embodiments.

Figure 9:
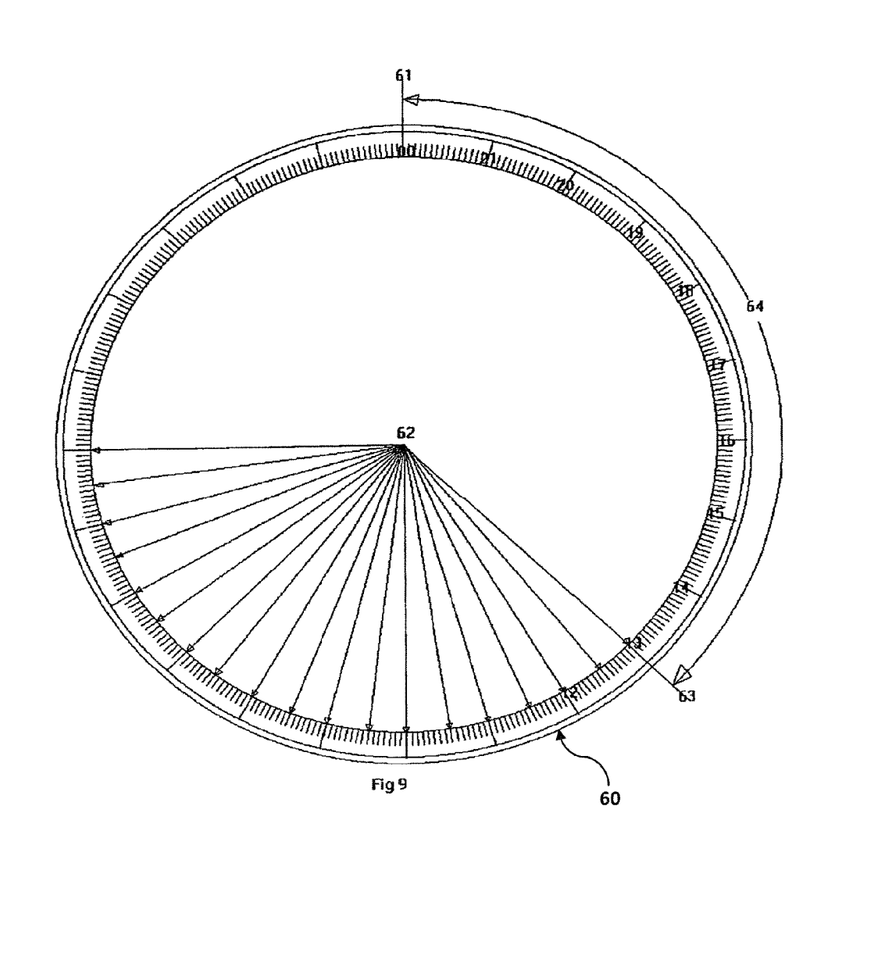
FIG. 9 shows a plan view of a rim protector of a fourth embodiment of the invention.

A fourth embodiment of the invention is shown in FIG. 9 of the accompanying drawings. This embodiment can extend any of the embodiments referred to above with respect to FIGS. 1 to 8 of the accompanying drawings.

In this embodiment, a rim protector 60 that can be according to either of the above embodiments is provided in a circular shape. It provided so as to be able to be cut to shape. In order to fit this embodiment to a wheel, a first cut is made at point 61; the rim protector can be supplied to an end user in this state, or the user can make the cut himself.

Graduations 62 are provided on the rim, with indices in units of inches (2.54 cm) in diameter of the wheel to which the rim protector is to be fitted. A user makes a second cut at the index graduation corresponding to the size of his wheel; in the example shown in FIG. 8 a cut at point 63 corresponds to a 13 inch (33 cm) diameter wheel. The shorter section 64 remaining can then be discarded.

In order to fit the rim protector on the wheel, rather than deflating the tyre and lifting its edge off the wheel, it has been appreciated that with this ended version of the rim protector 60, the protector can simply be hammered into place. With the tyre preferably fully deflated, but still on the wheel, the user takes one end of the cut rim protector 60, and forces under the tyre in situ. Conveniently, a rubber mallet may be used. The user then continues around the tyre, forcing the length of the rim protector under the tyre until the other end is adjacent to the original end.

A sealing compound can then be applied to fill any minor gap that may be left, and to avoid the ingress of dirt and the like into the space. Even if this were not done, it is unlikely that a small gap between ends would lead to a significant loss of pressure in the tyre once inflated, as the bead of the tyre will be pressing down on the rim in that region. The sealing compound can be made to match the colour of the rim protector, which therefore gives a consistent cosmetic appearance to the fitted rim protector.

Finally, the tyre can be fully reinflated.

The method by which the rim protector of this embodiment can be installed is particularly convenient, because it does not require the tyre to be removed. As such, it does not require any equipment more specialised than a rubber mallet, whereas to install the uncut versions described above is likely to require specialised tyre-replacement machinery. As such, an end user is likely to be able to install this embodiment himself, rather than having to take his car to a tyre workshop.

The rim protector can be made any desired colour; as such, it may represent a possible customisation of the appearance of the vehicle's wheels to an image-conscious vehicle owner.

Whilst the embodiments have been described with reference to car alloy wheels, it is appreciated that invention has applications to any vehicle wheel where it is desired to protect particularly the rim from impact and abrasion damage.

The invention claimed is:

1. A device to protect a wheel of a vehicle from damage, comprising:
    a rim protector formable into a generally circular annulus having an axis defining radial and axial directions, the rim protector including a tail portion, sized to fit, in use, between the wheel and a tire fitted to the wheel; and
    a head portion, the head portion having a width wider than a width of the tail portion, the tail portion connected to and extending away from the head portion, the tail portion insertable between the wheel and the tire, the head portion thereby configured to abut a rim of the wheel, the head portion overlapping the rim and extending radially over the rim, the tail portion provided with a ridge on a side of the tail portion that, in use, engages the wheel at an end thereof that connects to the head portion, the ridge being sized and positioned so as to define, in use, an edge of a contact between the tail portion and the wheel, and such that, when installed on the wheel there is a gap between the head portion and the rim of the wheel.

2. The rim protector of claim 1, in which the head portion has a tire-engaging surface which, in use, engages the tire and a rim-engaging surface which engages the rim of the wheel.

3. The rim protector of claim 2, in which the tire-engaging surface is shaped so that pressure from the tire on the tire-engaging surface forces, in use, the rim-engaging surface against the rim.

4. The rim protector of claim 3, in which the tire-engaging surface is curved, and forms part of the junction between the tail portion and the head portion.

5. The rim protector of claim 1, in which the head portion is provided with an impact surface, on the side that is radially outward in use.

6. The rim protector of claim 5, in which the impact surface is sloped so that, when the rim protector is fitted between a tire and a wheel, when moving radially inwards the impact surface slopes axially outwards away from the tire.

7. The rim protector of claim 6, in which the head portion is provided with a rubbing which lies in use generally in an axial plane over the rim.

8. The rim protector of claim 7, in which at least one of the impact and rubbing surfaces is shaped so that, in use, the radially outmost impact surface deflects any impacts axially outwards onto the rubbing surface.

9. The rim protector of claim 8, in which, when fitted between the wheel and tire, the impact surface will be on a part of the head portion radially outwardly over the tire, whilst the rubbing surface will be radially inwardly over the rim.

10. The rim protector of claim 9, in which, when fitted to a wheel, the head portion is thicker axially at the rubbing portion than at the impact portion.

11. The rim protector of claim 1, in which the at least one tail portion is provided with at least one ridge on the side that, in use, engages the tire.

12. The rim protector of claim 1, provided with reference indicia indicating where a user should cut away an arc of the rim protector in order to fit the rim protector to wheels of different sizes.

13. A vehicle wheel having an axis defining radial and axial directions, the wheel comprising:
 a rim having a peripheral edge surface at the outermost portion of the rim in the axial direction;
 a tire fitted to the wheel around the rim, the peripheral edge surface of the rim extending from the fitted tire towards the axis in the radial direction; and
 a rim protector, the rim protector being formed as a generally circular annulus and including,
  a tail portion, sized to fit, in use, between the wheel and the fitted tire,
  a head portion from which the tail portion extends, the head portion dimensioned wider than the tail portion extendable radially over to substantially cover the outermost peripheral edge surface of the rim, the head portion extendable along at least a portion of the circumference of the rim when the rim protector is installed, and
  a ridge provided on the tail portion on a side of the tail portion that, in use, engages the wheel at an end thereof that connects to the head portion, the ridge being sized and positioned so as to define, in use, an edge of a contact between the tail portion and the wheel, and such that, when installed on the wheel there is a gap between the head portion and the rim of the wheel.

14. The wheel of claim 13, in which the rim of the wheel has a maximum outer diameter which contacts the rim protector at a given point; where the rim protector is formed from a resilient material, and the internal diameter of the rim protector at the given point when it is not fitted to the wheel is smaller than the maximum outer diameter of the rim.

15. The wheel of claim 13, in which the wheel is a wheel of a car, motorbike, pedal bicycle, goods vehicle, bus, taxi or other rubber-wheeled vehicle.

16. The wheel of claim 13, in which the rim protector is substantially cylindrically symmetrical about the axis.

17. A rim protector for a wheel of a vehicle, the wheel defining a central rotational axis, a rim of the wheel having a peripheral edge surface at the outermost portion of the wheel in an axial direction along the central axis, the peripheral edge surface extending from adjacent a tire fitted to the wheel towards the central axis in a radial direction normal to the central axis, the rim protector comprising:
 a tail portion sized to fit, in use, between the wheel and the tire when the tire is fitted to the wheel;
 a head portion from which the tail portion extends the head portion dimensioned wider than the tail portion, the head portion positionable to overlap an edge of the rim and extendable further radially over the rim than it does over the tire thereby substantially covering the outermost peripheral edge surface, the rim protector formable as a generally circular annulus about the axis, the head portion extendable along at least a portion of the circumference of the rim when the rim protector is installed; and
 a ridge provided on the tail portion on a side of the tail portion that, in use, engages the wheel at an end thereof that connects to the head portion, the ridge being sized and positioned so as to define, in use, an edge of a contact between the tail portion and the wheel, and such that, when installed on the wheel there is a gap between the head portion and the rim of the wheel.

18. A method of installing the rim protector of claim 1, the method comprising forcing an end of the rim protector between the tire and the wheel, and then working a length of the rim protector between the tire and the wheel.

19. A protector for a vehicle wheel rim for supporting a tire, the wheel defining a central rotational axis, the rim having a peripheral edge surface at the outermost portion of the wheel in an axial direction along the central axis, the peripheral edge surface extending from adjacent a tire fitted to the wheel towards the central axis in a radial direction normal to the central axis, the protector comprising:
 a head portion having a width extendable over and substantially covering the outermost peripheral edge surface of the rim and extendable along a substantial portion of the circumference of the rim when the protector is installed onto the rim, the width of the head portion thereby configured to protect the outermost peripheral edge surface from an impact;
 a tail portion extending from the head portion and having a width narrower than the width of the head portion, the tail portion shaped to be pressed between the rim and the tire when the protector is installed between the tire and the rim, thereby securing the protector to the rim when the tire is installed onto the rim; and
 a ridge provided on a side of the tail portion that, in use, engages the wheel at an end thereof that connects to the head portion, the ridge being sized and positioned so as to define, in use, an edge of a contact between the tail portion and the wheel, and such that, when installed on the wheel there is a gap between the head portion and the rim of the wheel.

20. The protector of claim 19, the head portion having an impact surface at the outermost portion of the head portion in the axial direction for absorbing the impact, the impact surface sloped to face away from the central axis.

* * * * *